(12) United States Patent
Lasson

(10) Patent No.: US 7,976,664 B2
(45) Date of Patent: Jul. 12, 2011

(54) METHOD FOR PRODUCING A PACKAGING MATERIAL

(75) Inventor: Rolf Lasson, Lund (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 1413 days.

(21) Appl. No.: 11/338,736

(22) Filed: Jan. 25, 2006

(65) Prior Publication Data
US 2006/0121245 A1    Jun. 8, 2006

Related U.S. Application Data

(62) Division of application No. 10/416,753, filed as application No. PCT/SE01/02751 on Dec. 12, 2001, now Pat. No. 7,070,551.

(30) Foreign Application Priority Data

Dec. 18, 2000  (SE) ........................................ 0004708

(51) Int. Cl.
   *B29C 47/00*   (2006.01)
   *B32B 38/04*   (2006.01)
(52) U.S. Cl. ............... 156/199; 156/244.18; 156/244.25; 156/244.27
(58) Field of Classification Search .................... None
   See application file for complete search history.

(56) References Cited

U.S. PATENT DOCUMENTS

| | | |
|---|---|---|
| 3,046,637 A | 7/1962 | Kusters et al. |
| 3,401,439 A | 9/1968 | Staats et al. |
| 4,037,299 A | 7/1977 | Smith |
| 4,317,265 A | 3/1982 | Chase et al. |
| 4,595,116 A * | 6/1986 | Carlsson ..................... 220/359.3 |
| 5,240,198 A | 8/1993 | Dörfel |
| 5,257,967 A | 11/1993 | Gysin |
| 5,958,570 A | 9/1999 | Schwambach et al. |
| 5,983,799 A | 11/1999 | Lane et al. |
| 6,276,271 B1 | 8/2001 | Busshoff |
| 6,474,389 B1 * | 11/2002 | Steelman et al. .............. 156/382 |
| RE38,468 E | 3/2004 | Lane et al. |
| 6,884,206 B2 * | 4/2005 | Lasson et al. .................. 493/210 |

FOREIGN PATENT DOCUMENTS

| | | |
|---|---|---|
| DE | 2237949 A | 3/1973 |
| DE | 3338487 A1 | 5/1985 |
| EP | 0630741 A1 | 12/1994 |
| EP | 0808710 A2 | 11/1997 |
| EP | 0679595 B1 | 8/2000 |
| JP | 57-118898 A | 7/1982 |

* cited by examiner

*Primary Examiner* — John L. Goff
*Assistant Examiner* — Barbara J. Musser
(74) *Attorney, Agent, or Firm* — Buchanan Ingersoll & Rooney PC

(57) ABSTRACT

A method for producing packaging material in web form comprising a carcass layer having through holes, openings or slits, a barrier layer on one side of the carcass layer, a plastic lining arranged outside the barrier layer, and a laminant thermoplast arranged between the carcass layer and barrier layer. The method involves bringing the barrier layer at the same time as the carcass layer to adhere to the plastic lining and/or to the laminant thermoplast film in a press nip. The press nip comprises an impression roller exhibiting a jacket surface faced with an inner facing layer of elastic material possessing a first hardness and a first thickness, and an outer facing layer of elastic material possessing a second hardness and a second thickness. The first hardness is greater than the second hardness and the first thickness is greater than the second thickness.

19 Claims, 2 Drawing Sheets

METHOD FOR PRODUCING A PACKAGING MATERIAL

This application is a divisional application of application Ser. No. 10/416,753 filed on May 15, 2003, now U.S. Pat. No. 7,070,551 which is a U.S. national phase application of PCT/SE01/02751 filed on Dec. 12, 2001 designating the United States, and which claims priority under 35 U.S.C. §119(a) of Swedish Application No. 0004708-4 filed Dec. 18, 2000.

FIELD OF THE INVENTION

The present invention relates to a method for producing packaging material which is in the form of a continuous laminate web and is of the type which comprises a carcass layer made of paper or carton, one side of which exhibits a layer which is arranged outside the carcass layer and which comprises, on the one hand, a barrier layer and, on the other hand, a plastic lining which is arranged outside the barrier layer and which comprises one or more thermoplastic materials, with the carcass layer being covered by the said layer along the whole of its surface while the layer, along selected parts, extends beyond the edges of the carcass layer. In the present instance, a barrier layer means a layer which first and foremost constitutes a barrier to oxygen.

BACKGROUND OF THE INVENTION

A preferred barrier-layer consists of a metal foil layer, preferably an aluminium foil layer. Disposable packaging containers, particularly those for storing liquids, are frequently produced from a packaging material which consists of a carcass layer of paper, which layer is covered with thermoplastic materials and aluminium foil. The packaging material is frequently supplied in the form of webs which are reeled on storage reels and which, after having been unrolled from their storage reel, are converted, by means of folding, into packaging containers in automatic packaging machines. A commonly occurring packaging of this type is that which is marketed under the trade name TETRA BRIK and which is preferably used for liquid filling material of the milk, fruit juice, etc. type. This packaging container is produced in automatic packaging and filling machines in such a way that the web which is unrolled from the storage reel is transformed into a tube by the edges of the web being joined in an overlap seam, after which the tube which has been formed is filled with the intended filling material and subdivided into individual packaging containers by means of repeated transverse seals, which are arranged at a distance from each other and at right angles to the tube. After the filling material which has been supplied has been enclosed in this way in sealed-off parts of the tube, these parts are separated from the tube by means of cuts made in the said transverse sealing zones. The subdivided tube parts are then shaped, by means of folding along crease lines which are arranged in the packaging material, to form packaging containers of the desired shape, for example a parallelepipedic shape.

Packagings of this type are frequently provided with opening notches in the form of holes, openings or slits which are made in the packaging material and which are covered with strips which can be torn off and which are normally termed "pull-tabs". Alternatively the packaging device is provided with an external opening device, for example in the form of a plastic pouring spout having a screw top for resealing, which opening device is only allowed to penetrate the packaging laminate in connection with the packaging being opened and the product being used. In this connection, the packaging laminate is provided with an opening which consists of a punched-out hole in the carcass layer, over which hole aluminium foil and thermoplastic layers have been laminated. Thus, when the filling material consists of a sterile product, such as sterilized milk, or an acidic product, such as orange juice, the packaging container is frequently manufactured from a packaging laminate comprising an aluminium foil layer which makes the packaging extremely impervious to the penetration of gases, such as oxygen, which can oxidize the contents and impair its quality. In order to achieve the desired imperviousness, it is very important that the aluminium foil layer is not broken or damaged during the shaping of the packaging or when the packaging material is being manufactured and, for the function of the tear strip opening (the pull tab) or the penetrating opening device, it is of importance that the aluminium foil layer adheres extremely well to the area around the opening holes since otherwise the opening operation can easily fail. Thus when a covering strip has been affixed over the intended opening, this strip can be torn off in connection with this operation, without, for all that, the inner lining of plastic and aluminium foil being torn open. When a penetrating opening device is used, this opening device can fail to make a clean cut in the aluminium foil and thermoplastic layer, resulting in frayed edges.

An object of the invention is, in a simple and effective manner, to treat and prepare a packaging material web of the abovementioned type such that the edge of the packaging material web is effectively sealed off using an upper plastic film or a plastic film which is arranged around the edge zone. It is known to seal off liquid-absorbing material edges, which are exposed to the inside of a packaging container, with bridging thermoplastic strips or thermoplastic strips which are folded around the edges. It is also known, for the same purpose, to provide the packaging material web with what is termed a fixed plastic edge strip, i.e. with a plastic strip which projects from the edge of a carton web and which can be folded around the edge and sealed to its opposite side. Such a "fixed edge strip" is obtained by arranging carton webs alongside each other, such that they form a slit or gap between each other, after which the webs and the slits are jointly covered with a plastic foil or, in certain cases, with a plastic foil and an aluminium foil, after which the covered webs are separated by means of a cut made in the slit region, thereby forming a projecting, fixed strip. A drawback has hitherto been that it is not possible to obtain adherence, or it is at all events a poor adherence which is obtained, between, for example, an aluminium foil layer and a plastic layer in the region of the slits since the aluminium foil and the plastic layer cannot be pressed together within the region of the cut and, in particular, not right up to the boundary edges of the slits due to the varying thickness of the material and the resulting difficulty for the pressure rollers to compress the material within the slit region.

Packaging material of the type which is meant here can be produced by means of known technology, by applying the different layers, i.e. the aluminium foil layer, the inner plastic layer, etc., in several separate lamination operations, to the carcass layer consisting of paper or carton, and such a lamination procedure works very well when the carcass layer is not provided with holes, openings or slits, i.e. regions where the covering layers extend beyond or past edge zones of the carcass layer. It has been found that, when an aluminium foil is being layered onto a carcass layer web consisting of paper or carton, where the carcass layer is provided with holes, openings or slits, difficulties arise due to the fact that, in connection with the lamination, where the binding laminating layer frequently consists of a thin extruded thermoplastic film, the aluminium foil has to be pressed against the carcass layer base using an impression roller or soft pressure roller in order to achieve sufficient adherence between the aluminium foil layer and the carcass layer. Since the aluminium foil layer is as a rule very thin (from approx. 5 to 10 µm), it comes to be pressed, by the impression roller, against the edges around the opening or the slits in the carcass layer and partially pressed into the said holes or openings. Since the perforations have a relatively sharp edge, there is a risk of the aluminium foil rupturing and, at all events, the risk arises of the aluminium foil becoming creased around the edges of the openings or the slits and, as a result, either being weakened or achieving poor adherence with the carcass layer precisely in the edge zones of the holes or openings. Furthermore, the adherence between the plastic layer and the aluminium foil layer is poor in the region of the said holes or slits since the pressure of the impression roller in the said regions is limited due to the reduction in the thickness of the material in the said holes or slits.

The above mentioned circumstances have constituted a severe problem which has firstly caused ruptures in the aluminium foil layer, and consequently caused the gas-tightness of the packagings to be inadequate, secondly caused the opening function to be defective due to poor adherence between the aluminium foil layer and the carcass layer in the edge zones around the openings and thirdly caused poor adherence between the aluminium foil layer and the plastic layer along the parts where the aluminium foil layer and the plastic layer project outside the carcass layer and are consequently not supported by this layer when being pressed together.

The adherence between the aluminium foil layer and the film of laminant thermoplast which binds the aluminium foil layer to the carcass layer, and the adherence between the aluminium foil layer and the plastic lining which is arranged outside this layer (i.e. the plastic lining which comes to be in direct contact with the liquid foodstuff which is to be stored in the finished packaging) are especially critical. In the region of the said holes or slits, this adherence is frequently poor since the material exhibits a reduction in thickness in the holes or slits, which reduction in thickness results in the pressure of the press nip being lower at these sites. In other words, the reduction in thickness means that the press nip, comprising an impression roller and a cooled cylinder, is unable to press the aluminium foil layer and the different polymer layers together sufficiently for achieving the requisite adherence in essentially the whole of the region defined by the hole or the slit. This is expressed as air inclusions adjacent to the edges of the hole or slit, which in turn means that problems of fracture formation in the aluminium foil arise, leading to impaired gas-tightness and consequently problems with asepsis. The air inclusions also result in it being difficult to tear off or penetrate the membrane consisting of the aluminium foil and the polymeric films in the hole/slit, with the ability to open the packaging being restricted and/or with it not being possible to make a clean cut when penetrating, resulting in the formation of frayed edges.

The difficulty of solving the problem of poor pressure in the press nip in the region of the holes/slits is aggravated by the fact that it is at the same time necessary, in the press nip, to pay regard to optimization aspects in relation to the adherence between the aluminium foil and the different polymer layers in the regions outside the regions of the holes/slits. The polymeric layer which is to be laminated to the aluminium foil is extruded in molten or semi-molten form directly into the press nip and has to be pressed together by the nip before the temperature of the polymeric material falls too much, in connection with which the material solidifies. This means that the line load in the nip is only effective for laminating during the course of a first, relatively short, press nip length. A press nip length which exceeds this effective press nip length only means that the line load is distributed over a greater area, something which is a disadvantage since the pressure in the press nip then becomes lower. For this reason, conventional impression rollers are manufactured with a surface facing of relatively high hardness, normally greater than 80-90 Shore A, giving a short press nip length. However, this relatively hard, surface facing results in the adherence in the regions of the holes/slits being poor, as previously discussed.

Another problem in connection with laminating a polymer film to a carcass layer consisting of paper or carton, which carcass layer exhibits through holes, openings or slits, is that the polymeric material tends to accumulate in connection with these holes, openings or slits.

JP 57118898 describes a press roller which is indicated, in a general manner, as being able to be used in connection with manufacturing paper, plywood, etc. The roller which is described comprises a core of steel and an outer layer of polyurethane rubber. In order to prevent the outer layer peeling off, a layer of a non-porous polyurethane resin, which layer has a hardness of 75 Shore D and is bound to the core by means of a binding layer of the phenol type, is arranged between the core and this outer layer. The press roller is not specifically aimed at laminating packaging material, with the problems which arise when a carcass layer for the packaging material exhibits through holes, openings or slits, and is therefore naturally not suitable for solving such problems.

SUMMARY OF THE INVENTION

The present invention aims to tackle the above complex of problems. In particular, the invention aims to offer an impression roller which provides, in the hole regions of the carcass layer, improved adherence between the aluminium foil layer and one or more polymer layers which abut it, for example a plastic lining consisting of one or more thermoplastic materials and/or a film consisting of a laminant thermoplast, which layer(s) is/are extruded directly into a press nip which comprises the impression roller in accordance with the invention. In this connection, the aim is that it should be possible to produce a press nip having an advantageously short press nip length and high line load at the same time as good adherence is achieved in the regions of the holes. Even in association with high line speeds, high line loads and short press nip lengths, the impression roller according to the invention should be arranged such that it has time to penetrate into the hole regions and laminate together the films and layers which are present at these locations.

These aims are achieved when use is made of the impression roller according to the invention as defined in Claim 1.

The invention also relates to a method for producing a packaging material using the impression roller according to the invention and to a packaging material which has been produced using the method.

The impression roller comprises a metal core having a circular-cylindrical jacket surface, which jacket surface is faced with an inner facing layer consisting of an elastic material which exhibits a first hardness and a first thickness. According to the invention, an outer facing layer consisting of an elastic material, which exhibits a second hardness and a second thickness, with the said first hardness being greater than the said second hardness and with the said first thickness being greater than the said second thickness, is arranged on the outside of this inner facing layer. The structure of both the inner facing layer and the outer facing layer is homogeneous or in the main homogeneous. Due to the outer facing layer of lower hardness, a desired penetration is achieved in the hole regions in the carcass layer when the carcass layer, the aluminium foil and the polymeric layer(s) pass through the press nip, at the same time as the low thickness of the outer, softer facing layer results in the press nip length not being appreciably extended, meaning that a desired pressure can be maintained in the press nip while retaining the line load.

According to one aspect of the invention, the said first hardness is at least 15% greater, preferably at least 20% greater, and even more preferably at least 25% greater, than the said second hardness, calculated in Shore A. In this connection, the outer facing layer normally exhibits a hardness of 50-80 Shore A, preferably 60-75 Shore A, while the inner facing layer exhibits a hardness of 60-99 Shore A, preferably 70-95 Shore A, and even more preferably 80-95 Shore A.

According to another aspect of the invention, the said second thickness, i.e. the thickness of the outer facing layer, constitutes 5-25%, preferably 7-20%, and even more preferably 8-15%, of the aggregate thickness of the facing layers. The said second thickness is expediently 1-10 mm, preferably 1-5 mm, and even more preferably 1-3 mm. The lower limit is determined by practical restrictions as to how thin the facing layer can be made. The principle is that it is best to make the outer facing layer as thin as possible. However, this layer should be at least as thick as the packaging laminate which is intended to be run in the press nip which uses the impression roller according to the invention. The inner layer expediently exhibits a thickness of at least 10 mm, normally at most 50 mm and frequently about 15-30 mm.

According to yet another aspect of the invention, the said inner facing layer and the said outer facing layer are fashioned from different types of elastomer material having different material properties. However, it is also possible to conceive of the layers being able to be fashioned from the same type of elastomer materials which has, however, been produced or treated in such a way that the material in the inner facing layer and in the outer facing layer, respectively, exhibits different material properties, in particular different hardnesses. Examples of possible materials, which are not, however, limiting for the invention, are polymeric materials such as different rubber or polyurethane materials.

BRIEF DESCRIPTION OF THE DRAWINGS

The invention will be described in more detail below while referring to the figures, of which.

DETAILED DESCRIPTION OF THE INVENTION

Figure 1:
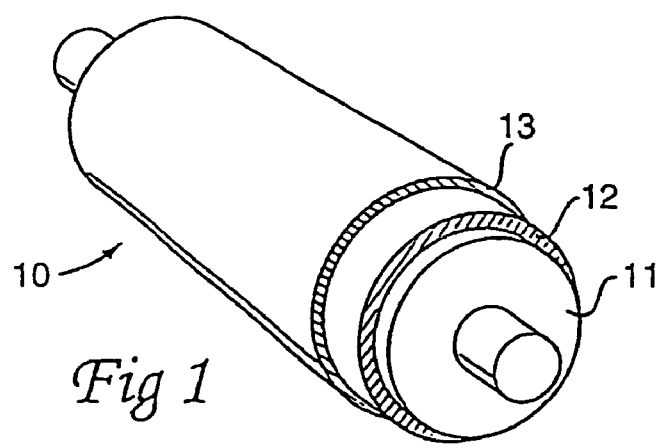
FIG. 1 shows a preferred impression roller according to the invention in perspective and with the different facing layers partially exposed.

FIG. 1 shows a preferred impression roller according to the invention, which roller is generally designated by 10. This roller typically exhibits an outer diameter of about 200-450 mm, in connection with which it should, however, be understood that the invention is not restricted to such diameters. While the core 11 of the roller consists of a solid metal core, usually made of steel, it is naturally also possible to conceive of this core not being of a solid design. An inner facing layer 12 consisting of an elastic material, which exhibits a first hardness and a fist thickness, as described above, is arranged on the circular-cylindrical jacket surface of the core 11. An outer facing layer 13 consisting of an elastic material, which exhibits a second hardness and a second thickness, with the said first hardness being greater than the said second hardness and with the said first thickness being greater than the said second thickness, as described above, is arranged on the outside of this inner facing layer 12. As a result of this design, the outer, relatively thin and soft layer, can be compressed, without giving rise to a press nip which is appreciably extended, at the same time as it is able to penetrate down in hole regions in the carcass layer of the packaging material which is to be coated.

Figure 2:
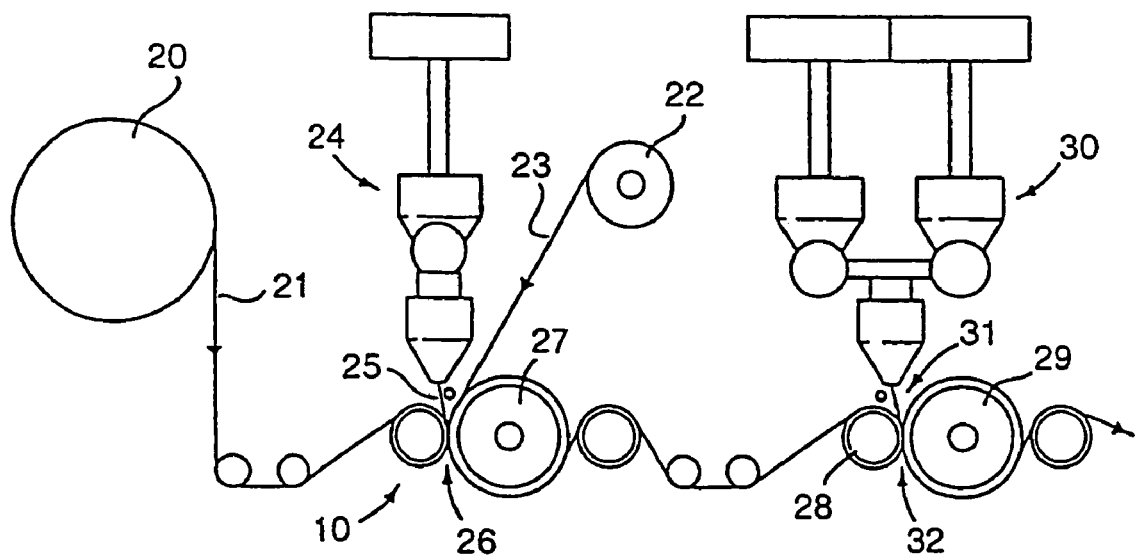
FIG. 2 shows a diagram of a line for laminating packaging materials, which line comprises two press nips, at least one of which uses an impression roller according to the invention.

The line shown diagrammatically in FIG. 2, for producing a packaging laminate of the type which is referred to here, comprises a storage reel 20 containing a web 21 of fibre material, i.e. paper or carton, which, on one of its sides, can exhibit a thin coating of a thermoplastic material, for example polyethene. A storage reel containing a thin aluminium foil web 23 (5-20 µm) is designated 22 and an extruder for forming a film of molten laminant thermoplast 25 (preferably polyethene) is designated 24. The impression roller 10, in accordance with the invention, interacts, in a press nip 26, with a cooled counterroller 27 having a steel surface in the laminating machine which is formed from these elements and also the extruder 24. From this first laminating machine 10, 27, 24, the packaging laminate, which is now semifinished, proceeds onwards to a second laminating machine which comprises a press nip 32, having an impression roller 28 and a cooled counterroller 29, and an extruder 30, which can be arranged to coextrude a double-sided film 31 consisting of two different thermoplastic materials. In the second laminating machine 28, 29, 30, the semifinished packaging laminate which comes from the first laminating machine 10, 27, 24 is laminated together with this double-sided film 31 on that side of the laminate which exhibits the aluminium foil. The double-sided film can, as an example, comprise ethylene acrylic acid ester, EAA, which is laminated closest to the aluminium foil, and low density polyethene, LDPE, on the outside of this.

During operation of the lamination line which is shown in FIG. 2, the impression roller 10 typically has a peripheral speed of up to 800 m/min, preferably 300-700 m/min, and even more preferably 400-700 m/min. The line load in the press nip 26 is typically 20-60 N/mm, preferably 20-50 N/mm, and the press nip length is at least 20 mm, preferably 20-35 mm, and even more preferably 20-30 mm. These orders of size of the line load and the press nip length are made possible by the impression roller 10 according to the invention. That which takes place in the press nip 26 as a result of the invention will be described in more detail in connection with FIGS. 3a-c.

Figure 3A:
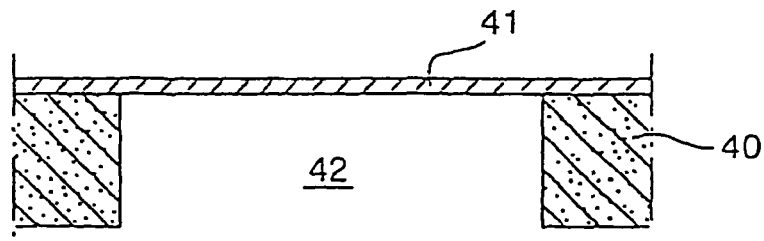
FIG. 3a shows a carcass layer for a packaging material, which carcass layer exhibits a punched-through hole and is coated, on one of its sides, with a plastic coating.

In FIG. 3a, which shows a greatly magnified cross section of a packaging laminate according to the invention, the fibre-based carcass layer of the laminate is designated 40 and a thin outer coating of thermoplast is designated 41. It is these two layers which constitute the web 21 which is conveyed away from the storage reel 20 in FIG. 2. The carcass layer 40 exhibits a punched-out, through hole 42, which hole is intended to form the opening part in the finished packaging which is manufactured from the laminate. The carcass layer 40, and thus the side walls of the hole 42, typically exhibits a height (thickness) of about 0.2-0.5 mm. The hole 42 can be of any selected shape whatsoeverever and normally exhibits a largest dimension (diameter or length) of at least about 10 mm and at most about 30 mm.

Figure 3B:
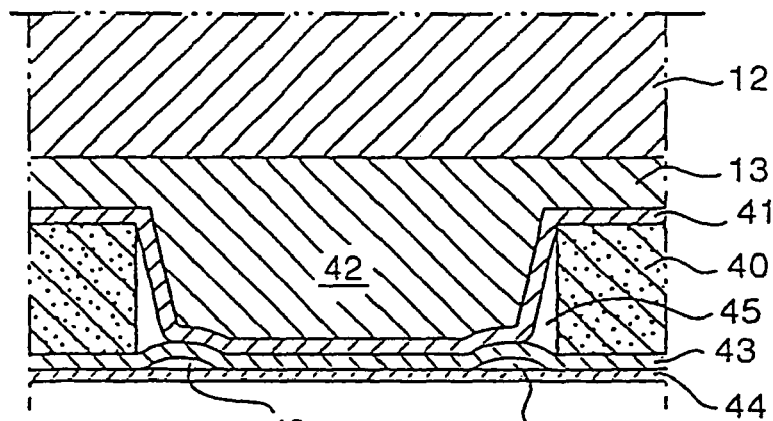
FIG. 3b shows how the two facing layers of the impression roller act in connection with the carcass layer according to FIG. 3a being laminated with a metal foil layer by way of a layer of a laminant thermoplast.
Figure 3C:
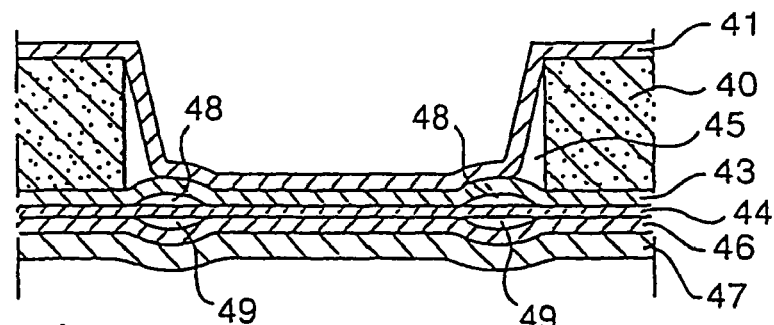
FIG. 3c shows the appearance of the packaging laminate after the laminating operation in accordance with FIG. 3b.

FIG. 3*b* shows how a film consisting of a laminant thermoplast 43 and an aluminium foil film 44, corresponding to the extruded film 25 and the aluminium foil web 23, respectively, in FIG. 2, is laminated to the carcass layer 40 over the main extent of the laminate. However, in the hole 42, the laminant thermoplast 43 and the aluminium foil 44 will, instead, be laminated together with the outer coating 41 since there is no carcass layer at this point. In this connection, the laminant thermoplast 43 binds to the outer coating 41, in connection with which any air inclusions 45 which may be present are not critical for the function of the hole. By contrast, it is considerably more critical to ensure that the aluminium foil 44 binds in an efficiently-covering manner to the laminant thermoplast 43, which is what constitutes the main problem for the present invention. Air inclusions 48, between the laminant thermoplast 43 and the aluminium foil 44, will therefore be formed in the area precisely within the edges of the hole 42, which air inclusions are, however, minimized as a result of the impression roller according to the invention. Thus, as is illustrated, the outer, relatively thin and soft layer 13 of the impression roller will be deformed in the areas where the carcass layer is present whereas, in the hole 42, where the carcass layer is not present, it will penetrate right down in the bottom of the hole and thereby press together the laminant thermoplast 43 and the aluminium foil 44. At the same time, the inner, relatively thick and hard layer 12 of the impression roller ensures that the desired pressure can be maintained over a desired, short press nip length in the regions outside the hole 42.

FIG. 3*b* shows the packaging laminate after it has also passed through the second laminating machine 28, 29, 30 in FIG. 2. In this connection, a coextruded thermoplastic layer consisting of a layer 46 of ethylene acrylic acid ester, EAA, has been laminated to the packaging laminate, closest to the aluminium foil, and a layer 47 of low density polyethene, LDPE, has been laminated to the packaging laminate outside of this EAA layer. In this case, too, critical air inclusions 49 can arise between the aluminium foil 44 and the thermoplastic layer 46. However, these air inclusions can also be decreased if an impression roller according to the invention is used in the second laminating machine.

EXAMPLE

Figure 4:
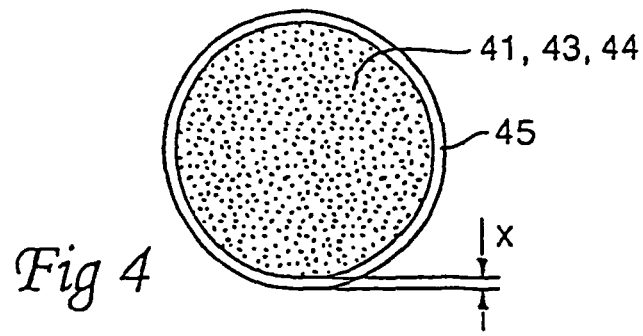
FIG. 4 shows a hole in a packaging material, which hole exhibits a narrow ring around its periphery, which narrow ring is a sign of air inclusions.

In an experimental series, the lamination of an externally coated carcass layer of Frövi Duplex CLC/C 270 g/m², 260 mN, with a layer of a laminant thermoplast consisting of LDPE, 25 g/m², was tested in a pilot machine which was run at 300 m/min. The hole in the carcass layer had a diameter of 19 mm. The experiments were performed at three different line loads. Two conventional impression rollers having only one facing layer each, which facing layer consisted of a rubber layer having a hardness of 80 Shore A were tested, as was an impression roller according to the invention, as shown in FIG. 1, which impression roller possessed a steel core having a diameter of 310 mm, an inner coating layer of 18 mm, having a hardness of 90 Shore A, and an outer facing layer of 2 mm, having a hardness of 70 Shore A. No layer of aluminium foil was used in the experiments so as to enable the result to be inspected visually in the transparent hole. Despite the lack of the aluminium foil layer, a clear contact difference in relation to the cooled counterroller emerged in the vicinity of the hole edges. FIG. 4 shows how the lack of contact is expressed as a ring of the width x, which ring runs around the edges of the hole. On visual inspection, the ring has a bright appearance whereas the thermoplastic material lying inside it, which material has been laminated together with good contact, has a dull appearance. Table 1 shows the width x of the ring in the comparative experiments and in the experiment according to the invention. The decrease in the width x which can be seen is expected to be even larger when aluminium foil is present in the laminate since the problem of air inclusion is for the most part related to the presence of the aluminium foil film.

TABLE 1

| Line load (N/mm²) | ⌀ 400 comparative (mm) | ⌀ 350 comparative (mm) | ⌀ 350 in accordance with the invention (mm) |
| --- | --- | --- | --- |
| 22 | 2.1 | 1.9 | 1.5 |
| 37 | 1.9 | 1.5 | 1.3 |
| 50 | 1.7 | 1.2 | 0.9 |

The invention is not limited by the above-described preferred embodiments. Thus, it should be understood, for example, that the impression roller according to the Invention can equally well be used as the impression roller 28 in the second laminating Machine in FIG. 2, in connection with which the impression roller in the first laminating machine can be of the type according to the invention or of a conventional type. It should also be understood that the impression roller according to the invention can also be used in lamination lines in which the order in which the different layers of the packaging laminate are laminated together is different. In brief, it can be used when laminating packaging laminates which possess holes or openings in the carcass layer, irrespective of the type of lamination line and irrespective of the order in which the different layers in the laminate are laminated together.

The invention claimed is:
1. Method for producing packaging material in web form comprising:
   conveying a barrier layer, a carcass layer which exhibits through holes, openings or slits, and a film of laminant thermoplast to a press nip comprised of an impression roller, the impression roller comprising a metal core exhibiting a circular-cylindrical jacket surface, which jacket surface is faced with an inner facing layer of an elastic material, exhibiting a first hardness and a first thickness, wherein an outer facing layer of an elastic material, exhibiting a second hardness and a second thickness, with the first hardness being greater than the second hardness and with the first thickness being greater than the second thickness, is arranged on the outside of the inner facing layer;
   pressing together the barrier layer, the carcass layer and the film of laminant thermoplast in the press nip so the outer facing layer of the impression roller deforms in areas where the carcass layer is present and penetrates into the through holes, openings or slits where the carcass layer is not present to adhere the barrier layer to the film of laminant thermoplast at the through holes, openings or slits and produce a film laminate in web form comprising the carcass layer of paper or carton exhibiting the through holes, openings or slits, the barrier layer on one side of the carcass layer, and the film of laminant thermoplast arranged between the carcass layer and the barrier layer.

2. Method according to claim 1, wherein the press nip is also comprised of a cooled counterroller positioned in opposing relation to the impression roller.

3. Method according to claim 1, wherein the impression roller exhibits a peripheral speed of up to 800 m/min.

4. Method according to claim 1, wherein the impression roller exhibits a peripheral speed of 300-700 m/min.

5. Method according to claim 1, wherein the impression roller exhibits a peripheral speed of 400-700 m/min.

6. Method according to claim 1, wherein the press nip exhibits a line load of 20-60 N/mm and a press nip length of at least 20 mm.

7. Method according to claim 1, wherein the press nip exhibits a line load of 20-60 N/mm and a press nip length of 20-35 mm.

8. Method according to claim 1, wherein the press nip exhibits a line load of 20-60 N/mm and a press nip length of 20-30 mm.

9. Method according to claim 1, wherein the second thickness constitutes 5-25% of the first thickness plus the second thickness.

10. Method according to claim 1, wherein the first hardness is 60-99 Shore A and the second hardness is 50-80 Shore A.

11. Method according to claim 1, wherein the film of laminant thermoplast is extruded into the press nip.

12. Method for producing a packaging material in web form comprising:
    conveying a film laminate to a press nip comprised of an impression roller, the film laminate comprising a carcass layer of paper or carton exhibiting the through holes, openings or slits, a barrier layer on one side of the carcass layer, and a film of laminant thermoplast arranged between the carcass layer and the barrier layer, the impression roller comprising a metal core exhibiting a circular-cylindrical jacket surface, which jacket surface is faced with an inner facing layer of an elastic material, exhibiting a first hardness and a first thickness, wherein an outer facing layer of an elastic material, exhibiting a second hardness and a second thickness, with the first hardness being greater than the second hardness and with the first thickness being greater than the second thickness, is arranged on the outside of the inner facing layer;
    conveying a thermoplastic material film to the press nip,
    pressing together the film laminate and the thermoplastic material film in the press nip so the outer facing layer of the impression roller deforms in areas where the carcass layer is present and penetrates into the through holes, openings or slits where the carcass layer is not present to adhere the barrier layer of the film laminate to the thermoplastic material film at the through holes, openings or slits and produce a web comprising the carcass layer of paper or carton exhibiting the through holes, openings or slits, the barrier layer on one side of the carcass layer, the film of laminant thermoplast arranged between the carcass layer and the barrier layer, and a plastic liner comprised of the thermoplastic material film arranged outside the barrier layer.

13. Method according to claim 12, wherein the press nip is also comprised of a cooled counterroller positioned in opposing relation to the impression roller.

14. Method according to claim 12, wherein the thermoplastic material film is extruded into the press nip.

15. Method according to claim 12, wherein the thermoplastic material film is a double-sided film comprising two different thermoplastic materials.

16. Method according to claim 15, wherein the thermoplastic material film is extruded into the press nip.

17. Method according to claim 12, wherein the impression roller exhibits a peripheral speed of 400-700 m/min.

18. Method according to claim 12, wherein the press nip exhibits a line load of 20-60 N/mm and a press nip length of at least 20 mm.

19. Method according to claim 12, wherein the second thickness constitutes 5-25% of the first thickness plus the second thickness.

* * * * *